United States Patent [19]

Von Dobeln

[11] Patent Number: 5,040,375

[45] Date of Patent: Aug. 20, 1991

[54] METHOD AND DEVICE FOR CONDITIONING OF A GAS

[76] Inventor: Wilhelm E. G. Von Dobeln, Bjorkvagen 3, Edebyberg, Sweden

[21] Appl. No.: 382,642

[22] PCT Filed: Feb. 8, 1988

[86] PCT No.: PCT/SE88/00042

§ 371 Date: Sep. 20, 1989

§ 102(e) Date: Sep. 20, 1989

[87] PCT Pub. No.: WO88/06261

PCT Pub. Date: Aug. 25, 1988

[30] Foreign Application Priority Data

Feb. 12, 1987 [SE] Sweden ............................ 8700572

[51] Int. Cl.$^5$ ............................................. F25D 17/06
[52] U.S. Cl. ................................................. 62/94; 62/271
[58] Field of Search ..................... 62/93, 94, 271, 272, 62/412; 237/2 B; 165/6, 7, 8, 9

[56] References Cited

U.S. PATENT DOCUMENTS 4,474,021 10/1984 Harband .................. 62/94

OTHER PUBLICATIONS

Patent Abstract of Japan, vol. 7, No. 37, M-193, JP 57-188948, published 1982.

Primary Examiner—Henry A. Bennett
Attorney, Agent, or Firm—Dowell & Dowell

[57] ABSTRACT

Method and device for conditioning of a gas which passes through the treatment zone in a regenerative moisture exchanging apparatus (10, 16) for instance a rotor for exchanging moisture with an absorbing bed in the exchanging apparatus. In order to regenerate the bed, a regenerant gas, such as air is passed through the exchanging apparatus in a further treatment zone which is separated from the first mentioned zone. The regenerant air is passed in a closed circuit (3-7) after the passage through the exchanger apparatus. The circuit comprises an evaporator(E) in a heat pump circuit by means of which the regenerant gas air is cooled and its moisture content is decreased. The regenerant air is then passed over a condenser(K) in the heat pump circuit by means of which the regenerant air is heated before being passed to the regenerating zone of the exchanger apparatus.

8 Claims, 4 Drawing Sheets

# METHOD AND DEVICE FOR CONDITIONING OF A GAS

BACKGROUND OF THE INVENTION History of the Related Art

Conventional sorption dehumidifiers are usually regenerated in a so-called open system, i.e. the regenerating air is taken from surrounding outside air and returned to the surroundings after it has passed a sorption mass and has driven the moisture out of it.

It is often a disadvantage to need duct connection to the surroundings, and a so-called closed regeneration system is then selected, in which, after the air through the sorption mass, the regenerating air is allowed to pass a cooler or condenser, in which this air is cooled so that the absorbed moisture is dispelled before the air is taken back to the sorption mass via a heater, wherein the temperature of the regenerating air is raised to drive the moisture out of the mass. In its turn the condenser is then cooled by a secondary air stream from the dehumidified enclosure which is then in turn supplied with the heat taken from the regenerating air.

This process is also has disadvantages. One such disadvantage is that the energy requirements compared with the open system will be higher. In addition the amount of heat which is supplied to the dehumidified enclosure via the secondary air through the condenser gives the enclosure a temperature increase, which can be troublesome. In certain cases when the dehumidified enclosure, and thus also the cooling air supplied to the condenser, has a temperature lying below 0° C. there is a risk that the condensate will freeze in the condensor, so that it will become blocked and no longer function.

SUMMARY OF THE INVENTION

The object of the present invention is to remove the above-mentioned disadvantages, by lowering the energy requirement considerably, by reducing the amount of heat transferred from the condensor to the dehumidified enclosure and by allowing condensation to take place at a temperature independent of the temperature in the dehumidified enclosure, this temperature being sufficiently high for preventing the condensate from freezing.

This object is achieved in accordance with the invention by the method and apparatus having been given the distinguishing features disclosed in the accompanying claims.

BRIEF DESCRIPTION OF THE DRAWINGS

The invention will now be described in more detail in connection with an embodiment example illustrated on the drawing, where FIG. 1 schematically illustrates an embodiment of an apparatus for carrying out a method in accordance with the invention.

DESCRIPTION OF THE PREFERRED EMBODIMENT

It is assumed in the following that the gas which is to be treated in accordance with the invention is air which is to be dried (dehumidified) and also that the regenerating gas is air, although the invention is not restricted in these respects.

Figure 1:
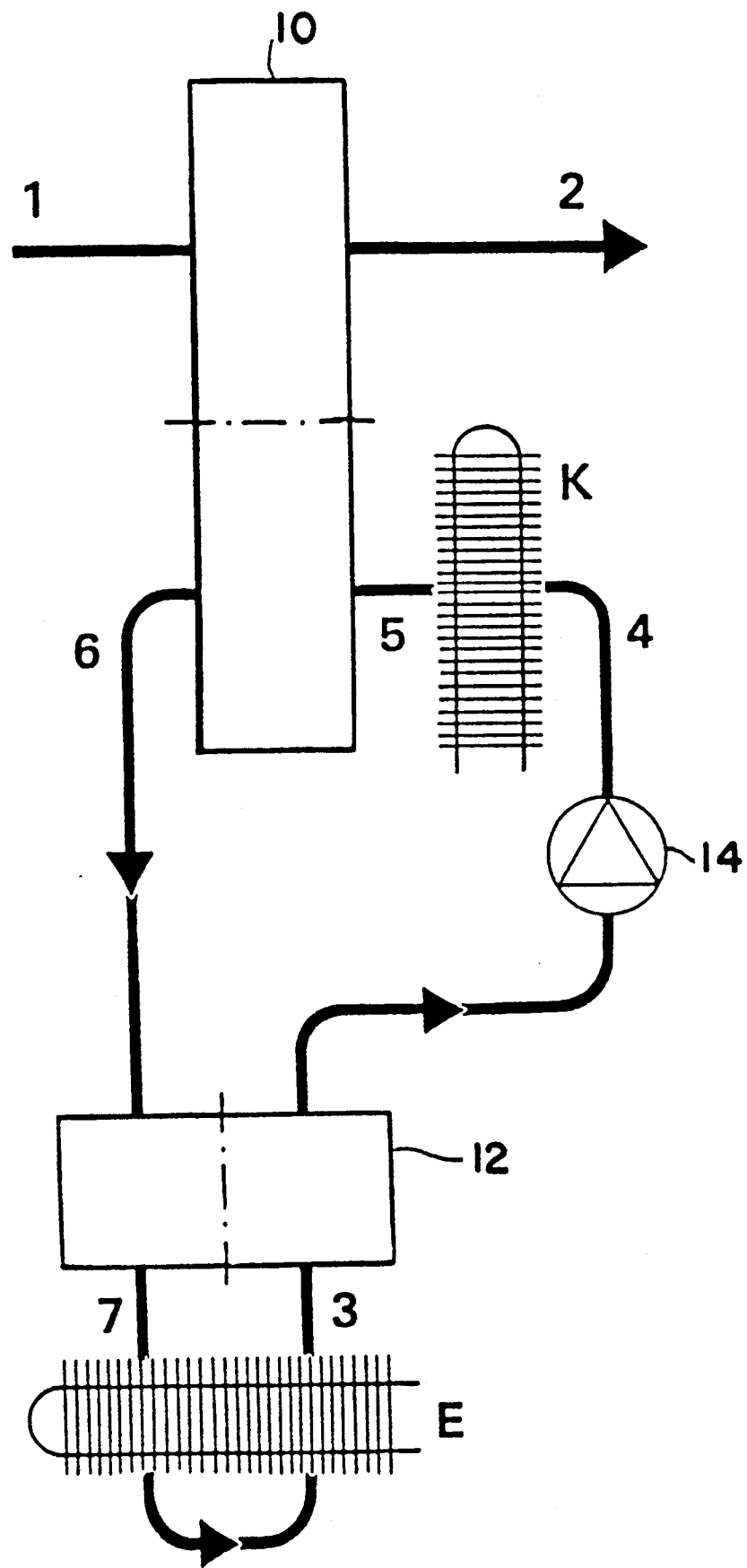

FIG. 1 solely illustrates the parts of the apparatus which are vital for explaining the invention, while other parts such as casings, fans etc. are excluded. The sorption apparatus as illustrated in FIG. 1 is thus illustrated as essentially including a regenerative drying rotor containing a mass having the ability to absorb moisture. The rotor can be implemented conventionally, and comprise such as alternatingly flat and corrugated layers of suitable material, e.g. glass fibre "paper" with hygroscopic additives. The layers are reeled one upon one another to form a large number of axial ducts which are open towards the end surfaces of the rotor. A recovery apparatus 12 is also illustrated in FIG. 1, and this apparatus can either be a temperature or a moisture exchanger. This recovery apparatus is not necessary for the function of the regeneration sequence, but lowers the energy requirements considerably, and is included in the sequences illustrated in FIGS. 2 and 3 for this reason. In the sequence according to FIG. 2, the recovery apparatus 12 is a temperature exchanger, and in the sequence according to FIG. 3 it is a moisture exchanger. By "moisture exchanger" is intended here an apparatus of conventional kind, e.g. of the same kind as the drying rotor 10, which can transfer moisture from one air stream to another without notably changing the heat content of the air streams.

In the apparatus illustrated in FIG. 1, outside air is caused by the state denoted by the point or numeral 1 to pass through the drying zone of the rotor 10 for dehumidifying the air, which is then given the state denoted by 2. As will be seen from the psychrometric charts in FIG. 2 and 3 the moisture content of the main air streams will decrease simultaneously as the air temperature increases from the point 1 to the point 2.

After the drying zone, the slowly rotating heat exchanging mass of the rotor 10 comes into a regeneration zone, in which the absorbed moisture is removed with the aid of pre-heated regenerating air, which is in counterflow to the main air stream in the drying zone.

In accordance with the invention a closed regeneration circuit is used for treating the regenerating air and the necessary heating and cooling for the treatment of the regenerating air is achieved with the aid of a heat pump. In the heat pump circuit there is included the vaporizer E and the condenser K as well as remaining parts necessary for the function, such as compressor, valve system etc. (not illustrated).

Figure 2:
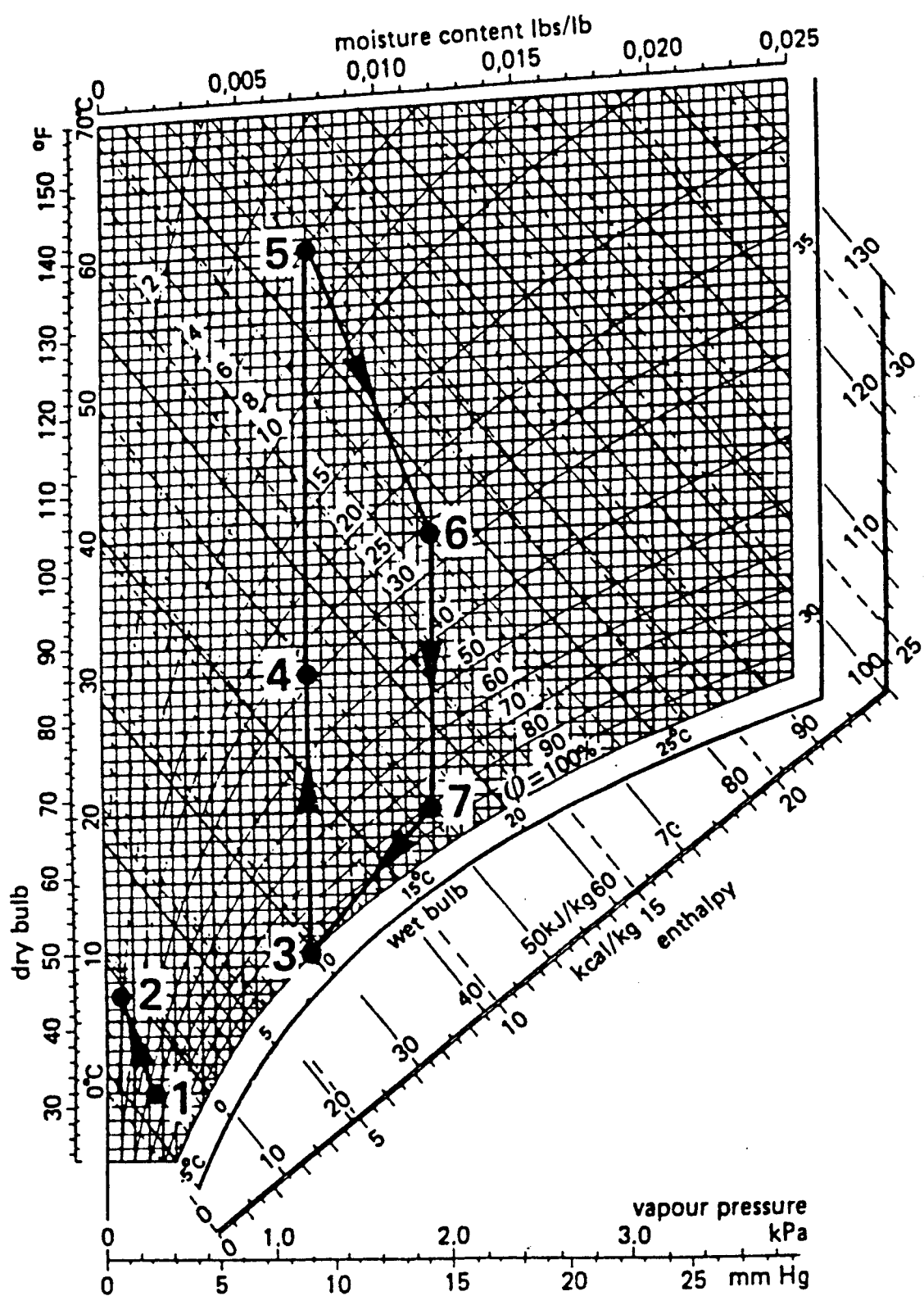
FIG. 2 illustrates in a psychrometric chart a dehumidifying and regenerating sequence in the method according to the invention.

In the embodiment according to FIG. 2 the regenerating air leaving the regeneration zone of the rotor 10 in the state 6 after having been cooled from the state or point 5 before the rotor 10, i.e. from about 60° C. to about 40° C. (and thus having absorbed a corresponding moisture amount, as will be seen from the psychrometric chart in FIG. 2) is taken to a temperature exchanger 12 in the regeneration circuit. The temperature exchanger 12 is divided into two zones where 40-degree air from point 6 is cooled in a first zone to such as 20° C. (point 7 in FIG. 2) by heat exchange with regenerating air which is cooled in a method which is described in the following. After the point 7 the regenerating air is allowed to pass over the outside of the vaporizer E which is connected in a heat pump circuit of conventional kind and which is therefore not described in any more detail.

In the passage over the vaporizer E, the regenerating air will be cooled to the state at point 3, i.e. to about 10° C., simultaneously as the moisture removed from the rotor 10 is dispelled so that the moisture content of the regenerating air is reduced between the points 7 and as will be apparent from FIG. 2. After the air has left the vaporizer E, it is taken into the second zone of the temperature exchanger 12 and is there heated to the state 4 by heat exchange with the 40-degree air at point 6 as mentioned above. The air temperature is thus raised from 10° C. at point 3 to about 30° C. at point 4, as will be seen from the chart in FIG. 2. With the aid of the schematically illustrated fan or pump 14, which provides the movement in the regenerating air, the air is taken to the above-mentioned condenser K in the heat pump circuit, the air temperature being raised from 30° C. at point 4 to about 60° C. at point 5 by heat exchange in the condenser, before the regenerating air is once again supplied to the drying zone of the drying rotor for dehumidifying the mass in the rotor 10.

The temperature exchanger 12 can be of the regenerative type with a rotor as temperature transferring mass, but it can also be of the recuperative type with a stationary exchanger body.

When the exchanger (recovery apparatus) 12 is a moisture exchanger, it can, as mentioned above, be of the same kind and have the same type of sorption mass and the same operation as the rotor 10. It may then be advantageous to build the two units together into a common rotor, and this is what has been shown in the apparatus according to FIG. 4. Irrespective of whether such building together of the moisture exchanging units takes place or not, the thermodynamic sequence will be the same, i.e. that depicted in the psychrometric chart in FIG. 3. This is therefore described with reference to the mechanical implementation illustrated in FIG. 4.

Figure 3:
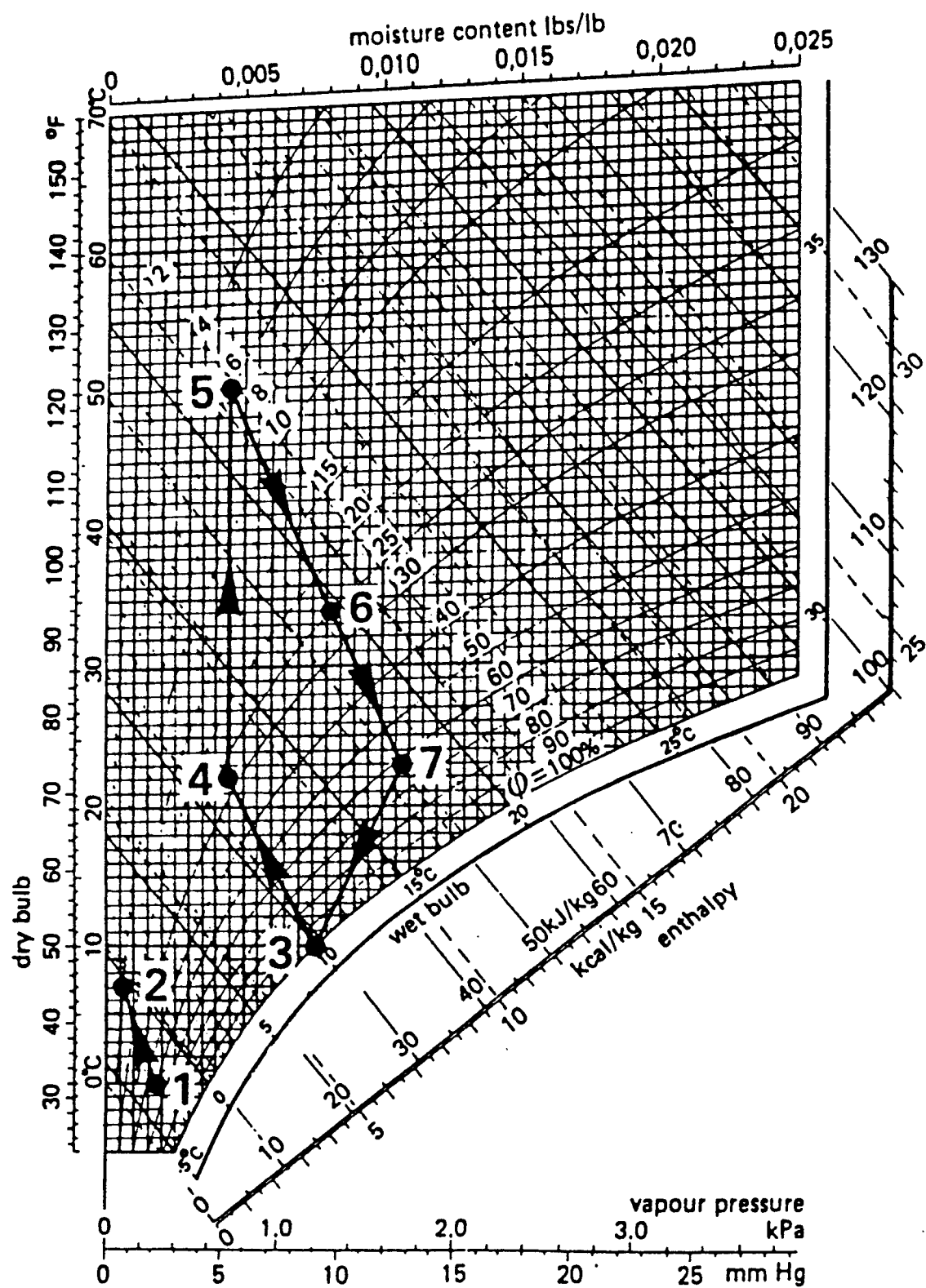
FIG. 3 is another dehumidifying and regenerating sequence which can be carried out with the method and apparatus according to the invention.
Figure 4:
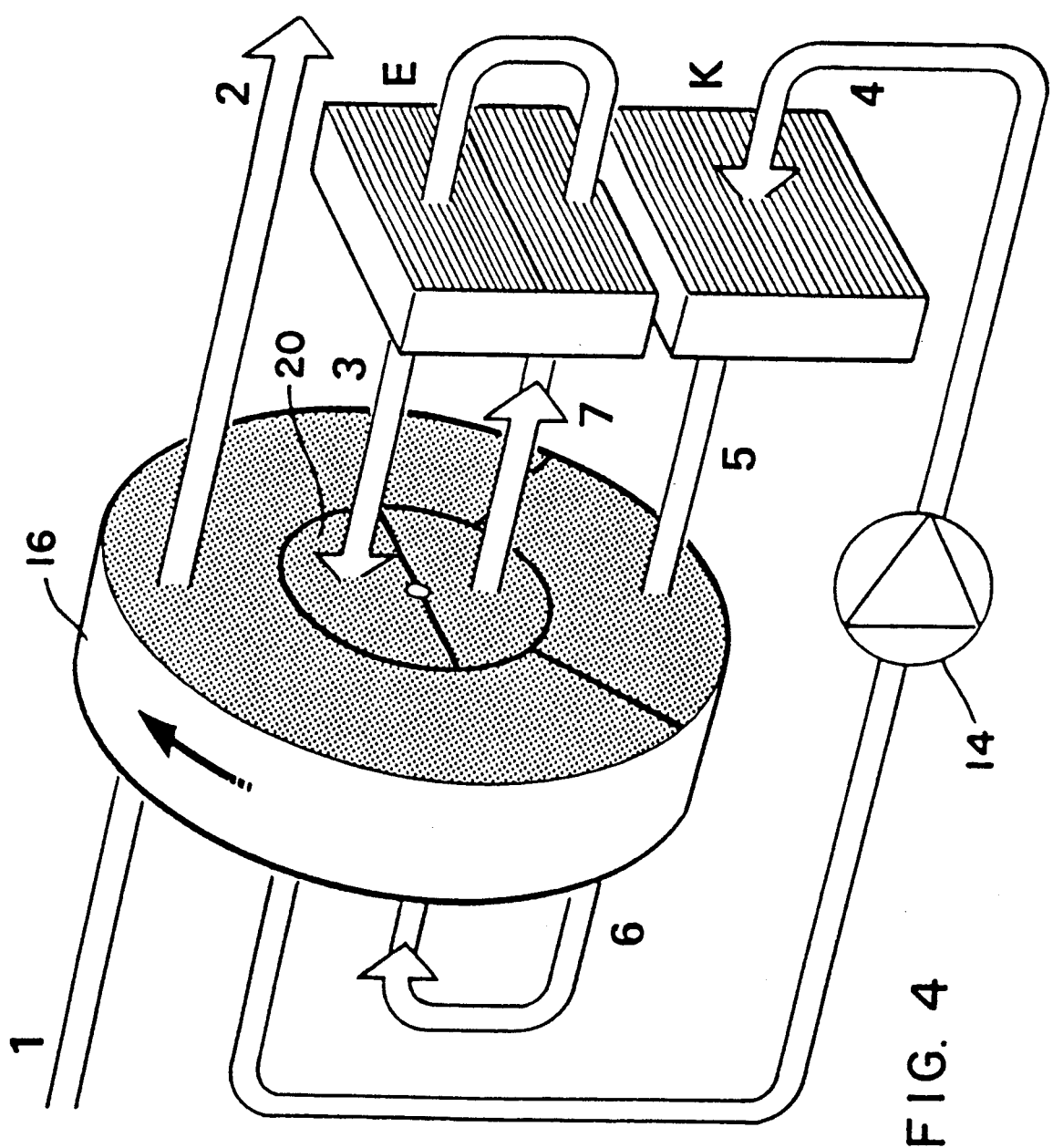
FIG. 4 is a perspective view of a method of arranging dehumidifying components in the sequence according to FIG. 3.

In the embodiment of an apparatus for carrying out the method of the invention illustrated in FIG. 4, the parts in this figure have been given the same reference characters as like parts in the apparatus according to FIG. 1. The numeral 16 denotes a drying rotor which, as with the rotor 10 in FIG. 1 is used for dehumidifying a main air stream. In contradistinction to the embodiment in FIG. 1, a central part of the rotor 16 is separated from the remainder of it with the aid of suitable partition walls, which also divides this central part into two separate zones 18 and 20. The surfaces on the rotor against which these walls seal are illustrated in the figure by the full lines dividing the rotor into corresponding zones. The central rotor part is used for moisture exchange between the streams of regenerating air before and after it has passed over the outer surfaces of the vaporizer E and has been cooled by it. The sequence in this embodiment is as follows: The main air stream is dried from the state 1 to the state 2 during passage through the drying zone of the drying rotor 16, as will be seen from the psychrometric chart in FIG. 3, and its temperature simultaneously increases by about 8° C. The drying rotor mass is regenerated in the regeneration zone downwards in FIG. 4, preheated regenerated air in the state 5 being humidified to the state 6 simultaneously as it is cooled from about 50° C. to about 34° C. The regenerating air is now led back again through the zone 18 in the central part of the rotor 16 and is there humidified further by moisture exchange between regenerating air which has passed the vaporizer E, as is described in the following. Simultaneously with the humidification there is a further temperature drop from point 6 to point 7, see FIG. 3. The air then passes the vaporizer E, through its lower and upper portion in the illustrated case, this vaporizer being included in a heat pump system described in connection with FIG. 1. During the passage through the vaporizer E there is cooling of the air and deposition of moisture so that the temperature falls and the moisture content decreases, as will be seen from FIG. 3. After passage through the vaporizer E, the air is taken through the zone 20 in the central part of the rotor 16, the moisture content further decreasing by moisture exchange with the air stream in the zone 18, which has been described above, simultaneously as the air temperature is raised between the points 3 and 4. Using a fan or pump 14 to maintain circulation in the closed regeneration circuit, the dehumidified and preheated air is supplied to the condenser K of the heat pump system, this condensor raising the temperature of the regenerating air from state 4 to the state 5, i.e. to about 50° C. In this state the air is taken once again to the regeneration zone of the drying rotor 16 for removing the moisture taken up by the mass in the rotor 16 in the drying zone.

In both the described thermodynamic sequences according to FIGS. 2 and 3, the final temperature of the air is about 10° C. after passage past the vaporizer E. The vaporizing temperature in the vaporizer E is sufficiently high for the risk of freezing to be non-existent. Even though the point 1 were to be displaced towards colder temperatures, the vaporizing temperature remains at a level such that no freezing takes place. The closed regeneration circuit sequence has thus been made independent of ambient climate.

The heat which is taken away in the vaporizer and which, in a conventional system, would be transferred to the dehumidified enclosure, now remains in the regeneration circuit and is utilized via the heat pump arrangement for regenerating the rotor. This results in a heavily lowered energy requirement, as well as avoiding an often undesired heating of the dehumidified enclosure. Lowing the energy requirement compared with a conventional closed regeneration system can be considerable, 3-5 times, when recovery in either of the given types will be utilized.

The invention is, of course, not restricted to the illustrated and described embodiments, but can be varied within the scope of the concept forming its foundation, as defined in the following claims. Accordingly, the sorption apparatus 10 can be of the so-called stationary type, i.e. it can have a sorption mass in one or more stationary containers, which are alternatingly regenerated and utilized for drying.

It is also possible to use the described regenerating method when contaminations other than water vapor are to be removed, e.g. paint solvents and the like.

I claim:

1. A method for conditioning a gas used in a regenerative exchange apparatus having a dehumidifying enclosure wherein gas passes in a closed circuit in heat exchange relationship with the vaporizer and condenser of a heat pump circuit comprising the steps of:
   a) directing the air from the regenerative exchange apparatus in heat exchange relationship with the vaporizer of the heat pump circuit to thereby cool the air and decrease its moisture content;

b) thereafter passing the cooled air in heat exchange relationship with the condenser of the heat pump circuit to elevate the temperature of the air; and c) directing the air passing from the condenser through the dehumidifying enclosure of the regenerative exchange apparatus.

2. The method of claim 1 including the additional step of passing the gas from the regenerative exchange apparatus in heat exchange relationship with the cooled gas passing from the vaporizer of the heat pump circuit to cool the gas prior to the gas passing in heat exchange relationship with the vaporizer.

3. The method of claim 2 including increasing the moisture content of the air from the regenerative exchange apparatus while passing in heat exchange relationship with the cooled gas passing from the vaporizer and concurrently raising the temperature and lowering the moisture content of the cooled gas from the vaporizer.

4. The method of claim 3 in which the air to the vaporizer and the cooled air from the vaporizer pass through a rotating heat exchanger having an absorbent material therein.

5. In a dehumidifying apparatus for dehumidifying a primary gas stream and in which the apparatus includes a moisture absorbing material therein and wherein regenerative means are provided for regenerating the moisture absorbing material by passing a regenerating gas stream therethrough to remove moisture therefrom, the improvement comprising, said regenerative means including a heat pump circuit having a vaporizer and a condenser, and a closed circuit means for directing the regenerating gas stream from the dehumidifying apparatus in heat exchange relationship with said vaporizer and subsequently with said condenser and for thereafter directing the regenerating gas stream through the moisture absorbing material.

6. The apparatus of claim 5 including heat exchanger means for passing said regenerating gas stream entering into and exiting from the vaporizer in heat exchange relationship with respect to one another.

7. The dehumidifying apparatus of claim 5 including exchanger means for receiving the regenerating gas streams entering into the vaporizer and exiting from the vaporizer to exchange moisture between the gas steams.

8. The apparatus of claim 5 in which the humidifying apparatus includes a rotor having an outer annular section and a pair of inner sections, said moisture absorbing material being disposed within said outer section, a second moisture absorbent material placed within each of said inner sections and said means for directing the regenerating gas directs the regenerating gas streams from the moisture absorbent material through a first of said pair of said inner sections and thereafter through said vaporizer and thereafter through the other of said pair of inner sections prior to directing the regenerating gas stream to said condenser.

* * * * *